United States Patent
Okazaki et al.

(10) Patent No.: US 7,874,622 B2
(45) Date of Patent: Jan. 25, 2011

(54) VEHICLE SEAT RECLINING DEVICE

(75) Inventors: Hiroyuki Okazaki, Chiryu (JP);
Yukifumi Yamada, Toyota (JP);
Kazuhide Ishikawa, Anjo (JP)

(73) Assignee: Aisin Seiki Kabushiki Kaisha, Kariya-shi (JP)

( * ) Notice: Subject to any disclaimer, the term of this patent is extended or adjusted under 35 U.S.C. 154(b) by 0 days.

(21) Appl. No.: 12/677,386

(22) PCT Filed: Sep. 3, 2008

(86) PCT No.: PCT/JP2008/065863
§ 371 (c)(1),
(2), (4) Date: Mar. 10, 2010

(87) PCT Pub. No.: WO2009/037973
PCT Pub. Date: Mar. 26, 2009

(65) Prior Publication Data
US 2010/0201175 A1   Aug. 12, 2010

(30) Foreign Application Priority Data
Sep. 21, 2007  (JP) .............................. 2007-245169

(51) Int. Cl.
  *B60N 2/235* (2006.01)
  *B60N 2/02* (2006.01)
  *B60N 2/20* (2006.01)
(52) U.S. Cl. .............................. 297/367 R; 297/378.12; 297/378.14
(58) Field of Classification Search ................. 297/367, 297/367 R, 378.12, 378.14
See application file for complete search history.

(56) References Cited

U.S. PATENT DOCUMENTS 6,112,370 A * 9/2000 Blanchard et al. ....... 297/367 R (Continued)

FOREIGN PATENT DOCUMENTS

JP          2003 9978          1/2003

(Continued)

OTHER PUBLICATIONS

U.S. Appl. No. 12/677,386, filed Mar. 10, 2010, Okazaki et al.

(Continued)

*Primary Examiner*—Rodney B White
(74) *Attorney, Agent, or Firm*—Oblon, Spivak, McClelland, Maier & Neustadt, L.L.P.

(57) ABSTRACT

In a vehicle seat reclining device, all projections are surely engaged in corresponding cam grooves and strength of every projection is assured. The seat reclining device includes a first cam groove formed at a first opposing surface of a pawl, a pawl control member provided in an inner space and rotatably disposed between the first arm and the first opposing surface, the pawl control member including at least a first projection to be inserted into the first cam groove and controlling movement of the pawl in response to the rotation thereof by engagement between the first cam groove and the first projection, a second projection formed at a second opposing surface of the pawl and a second cam groove formed at the second arm side, into which the second projection is inserted and including a restricting portion restricting the movement of the pawl towards the engagement state with an internal toothed portion by engagement with the second projection.

4 Claims, 6 Drawing Sheets

U.S. PATENT DOCUMENTS

| | | | |
|---|---|---|---|
| 6,609,756 B2 * | 8/2003 | Kojima et al. | 297/367 R |
| 6,626,495 B2 | 9/2003 | Okazaki et al. | |
| 6,715,835 B2 * | 4/2004 | Hoshihara et al. | 297/367 R |
| 6,880,887 B2 * | 4/2005 | Hoshihara et al. | 297/367 R |
| 7,066,541 B2 | 6/2006 | Uramichi | |
| 7,334,843 B2 * | 2/2008 | Yamada et al. | 297/367 R |
| 7,416,255 B2 * | 8/2008 | Yamada et al. | 297/367 R |
| 7,441,840 B2 * | 10/2008 | Yamada et al. | 297/367 R |
| 7,490,907 B2 * | 2/2009 | Nagura et al. | 297/367 R |
| 7,562,935 B2 * | 7/2009 | Kojima | 297/367 R |
| 7,802,849 B2 * | 9/2010 | Tarusawa et al. | 297/367 R |
| 2007/0040437 A1 * | 2/2007 | Nagura et al. | 297/367 |
| 2008/0048478 A1 * | 2/2008 | Koumura | 297/367 |
| 2008/0093903 A1 | 4/2008 | Fujioka et al. | |
| 2010/0201175 A1 | 8/2010 | Okazaki et al. | |
| 2010/0219669 A1 | 9/2010 | Yamada et al. | |

FOREIGN PATENT DOCUMENTS

| | | |
|---|---|---|
| JP | 2005 312891 | 11/2005 |
| JP | 2006 122443 | 5/2006 |

OTHER PUBLICATIONS

U.S. Appl. No. 12/677,327, filed Mar. 10, 2010, Yamada et al.
U.S. Appl. No. 12/922,778, filed Sep. 15, 2010, Yamada et al.

* cited by examiner

VEHICLE SEAT RECLINING DEVICE

TECHNICAL FIELD

This invention relates to a vehicle seat reclining device.

BACKGROUND OF THE TECHNOLOGY

Conventionally, a vehicle seat reclining device disclosed in the patent document 1 is known. As shown in FIG. 2 of the patent document 1, the vehicle seat reclining device includes a first arm (fixed side housing 11) fixed to a vehicle seat cushion side, a second arm (rotating side housing 12) fixed to a vehicle seat back side and relatively rotatably supported by the first arm, an internal toothed portion (toothed portion provided at a ratchet 12c) disposed in an inner space (accommodating space) between the first arm and the second arm and formed on the second arm and a pawl (slide pawl 15) provided within the inner space, movably supported by the first arm and provided with an external toothed portion engaging with or disengaging from the internal toothed portion upon movement.

The vehicle seat reclining device disclosed in the patent document 1 includes a rotation cam 16 enclosed by the slide pawl 15 and arranged on the same layer with the slide pawl 15, an operating plate 18 provided between the slide pawl 15 and the rotation cam 16 and the rotation side housing 12 and an unlocking plate 19. The slide pawl 15 is provided with a cam projection 15e and cam projections 15g and 15h projecting towards the rotation side housing 12. The operating plate 18 is provided with a cam groove 18d to be engaged with the cam projection 15e and a cam groove 18d-a to be engaged with the cam projections 15g and 15h. The unlocking plate 19 is provided with a cam groove 19c to be engaged with the cam projections 15g and 15h. The length of each cam projection 15g and 15h is set to be longer than the length of the cam projection 15e. The cam projections 15g and 15h penetrate through the cam groove 18d-a.

According to this structure of the vehicle seat reclining device, when the rotation cam 16 (operating plate 18) is rotated, slide pawls 15B to 15D are moved in a direction retracting from the ratchet 12c (engagement releasing direction) by the engagement between the cam projection 15e and the cam groove 18d. Further, when the rotation cam 16 (operating plate 18) is rotated, the slide pawl 15A is moved in a direction retracting from the ratchet 12c by the engagement between the cam projections 15g and 15h and the cam groove 18d-a and at the same the seat back is reclined toward front side and upon engagement of the cam projections 15g and 15h with the cam groove 19c, the slide pawl 15A moves to a position retracted from the ratchet 12c for fixing the position (keeping the disengagement state).

Patent Document 1: JA 2005-312891 A

DISCLOSURE OF INVENTION

Problems to be Solved

However, according to the above conventional vehicle seat reclining device disclosed in the patent document 1, since the cam projections 15g and 15h are in engagement with the cam groove 19c of the unlocking plate 19 through the operating plate 18, a machining error or assembling error may occur and due to such mechanical errors, the interference of the cam projections 15g and 15h for the cam groove 19c may be undesirably shortened. Further, the length of projection of the cam projections 15g and 15h must be set to be longer at least by the length corresponding to the thickness of the operating plate 18, which may lead to insufficient strength and the projections 15g and 15h may be broken at the root portion thereof.

The present invention was made in consideration with the above problems and the object of the invention is to provide a vehicle seat reclining device in which all cam projections can be firmly and surely engaged with the corresponding grooves and the strength of every cam projection can be sufficiently assured.

Means for Solving the Problem

The structure of the vehicle seat reclining device of this invention made for solving the above problem includes a vehicle seat reclining device comprises a first arm adapted to be fixed to one of a seat cushion side and a seat back side of a vehicle seat, a second arm adapted to be fixed to the other of the seat cushion side and the seat back side of the vehicle seat and relatively rotatably supported by the first arm, an internal toothed portion provided in an inner space formed between the first arm and the second arm, the internal toothed portion being formed at the second arm, a pawl provided in the inner space and movably supported by the first arm, the pawl having an external toothed portion engaging with or disengaging from the internal toothed portion in response to the movement of the pawl, a first cam groove formed at a first opposing surface of the pawl opposing to the first arm, a pawl control member rotatably provided in the inner space between the first arm and the first opposing surface and having at least a first projection inserted into the first cam groove, thereby controlling the movement of the pawl by the engagement between the first cam groove and the first projection in response to the rotation of the pawl control member, a second projection formed at a second opposing surface of the pawl opposing to the second arm and a second cam groove formed at a second arm side, into which the second projection is inserted and having a restricting portion for restricting the movement of the pawl in a direction to be engaged with the internal toothed portion by the engagement with the second projection and a non-restricting portion provided consecutively from both ends of the restricting portion for allowing the movement of the pawl in the direction to be engaged with the internal toothed portion without engaging with the second projection. The pawl control member includes a release plate provided in the inner space and rotatably disposed between the first arm and the first opposing surface, the release plate including the first projection inserted into the first cam groove and moving the pawl in response to the rotation thereof by the engagement between the first cam groove and the first projection, and a cam rotatably provided in the inner space, fixed to the release plate for unitary rotation therewith and pressing the pawl to be in contact with the internal toothed portion.

The structure of the vehicle seat reclining device associated with this invention further includes the first cam groove and the second projection being formed at the pawl by a half die cutting process (or, half blanking process) in which the pawl is pressed from the first opposing surface towards the second opposing surface.

The structure of the vehicle seat reclining device associated with this invention further includes a spring provided in the inner space between the first arm and the cam for rotatably biasing the cam in a direction to press the pawl and the release plate is formed with an engaging portion with which a cam side end of the spring is engaged.

The structure of the vehicle seat reclining device associated with this invention further includes the first arm being formed with a third projection formed at the same time an accommodating recess for accommodating therein a part of the pawl control member is formed at the first arm by a half die cutting process to be pressed from the inner space side, wherein the third projection is used as a joining projection for attaching the first arm to the seat cushion and the second arm is formed with a fourth projection formed at the same time the second cam groove is formed at the second arm by a half die cutting process to be pressed from the inner space side, wherein the fourth projection is used as a joining projection for attaching the second arm to the seat back.

The Effects of the Invention

In the vehicle seat reclining device according to the invention, the first projection formed at the pawl control member for controlling the movement of the pawl is inserted into the first cam groove formed at the first opposing surface of the pawl opposing to the first arm. Thus, when the pawl control member is rotated, the pawl engaged with the internal toothed portion is disengaged from the internal toothed portion by the first projection and the first cam. Further, the second projection formed at the second opposing surface of the pawl opposing to the second arm is inserted into the second cam groove formed at the second arm side and having a restricting portion and a non-restricting portion. According to this structure, when the second projection is engaged with the restricting portion, the movement of the pawl in a direction to be engaged with the internal toothed portion is restricted and accordingly the engagement of the pawl with the internal toothed portion is kept to be in disengaged state. Thus, without interposing any member between the pawl and the pawl control member, the first projection can be surely engaged with the first cam groove and the length of the first projection can be relatively shortened to assure the strength of the first projection. Further, without interposing any member between the pawl and the second arm side, the second projection can be surely engaged with the second cam groove and the length of the second projection can be relatively shortened to assure the sufficient strength of the second projection. Also, since the pawl control member is formed by the release plate and the cam, the pawl control member having relatively complicated structure is produced with a low cost by just integrally connecting the two different parts, i.e., release plate and the cam which are made separately.

In the vehicle seat reclining device according to a further feature of the invention, the first cam groove and the second projection are formed at the pawl by half die cutting process (half blanking process) in which the pawl is pressed from the first opposing surface towards the second opposing surface. The pawl can be manufactured with less cost and simple in production process.

In the vehicle seat reclining device according to a further feature of the invention, a spring is rotatably provided in the inner space between the first arm and the cam for biasing the cam in a direction to press the pawl and the release plate is provided with an engaging portion with which a cam side end of the spring is engaged. Thus the release plate has a spring supporting function to hold the spring to suppress the increase of the number of part and achieve the cost reduction accordingly.

In the vehicle seat reclining device according to a further feature of the invention, the first arm is formed with a third projection formed at the same time an accommodating recess for accommodating therein a part of the pawl control member is formed at the first arm by a half die cutting process to be pressed from the inner space side, wherein the third projection is used as a joining projection for attaching the first arm to the seat cushion and the second arm is formed with a fourth projection formed at the same time the second cam groove is formed at the second arm by a half die cutting process to be pressed from the inner space side, wherein the fourth projection is used as a joining projection for attaching the second arm to the seat back. Thus, the assembling efficiency of the first and second arms to the seat cushion and the seat back can be improved and also the thickness of the first and second arms can be reduced.

BRIEF EXPLANATION OF ATTACHED DRAWINGS

EXPLANATION OF REFERENCE NUMERALS

10; vehicle seat, 11; seat cushion, 12; seat back, 13; seat cushion frame, 13a; attaching recess, 14; seat back frame, 14a; attaching recess, 20; vehicle seat reclining device, 21; lower arm (first arm), 21a; recess, 21a1; inner peripheral surface, 21a2; accommodating recess, 21a3; accommodating recess, 21c; engaging portion, 21d; through hole, 21e; projection (third projection), 22; upper arm (second arm), 22b; recess, 22c; internal toothed portion, 22d; cam groove (second cam groove), 22d1, 22d3; wide width portion, 22d2; narrow width portion (restricting portion), 22d2a; projection, 22e; through hole, 22f; projection (fourth projection), 23; ring member, 24; lock mechanism, 25, 26; pawl, 25a, 26a; external toothed portion, 25b, 25c; leg portion, 25d; inner side surface portion, 25f; cam groove, 26b, 26c; leg portion, 26d; inner side surface portion, 26e; first opposing surface, 26f; cam groove (first cam groove), 26g; second opposing surface, 26h; cam projection (second projection), 27; release plate, 27a; cam projection (first projection), 27b; engaging portion, 27c; through hole, 28; cam, 28a; cam surface, 28b; through hole, 29; spring, 30; pawl control member, 31; operating lever, C; rotation axis, S; inner space.

THE BEST MODE EMBODIMENTS OF THE INVENTION

Figure 1:
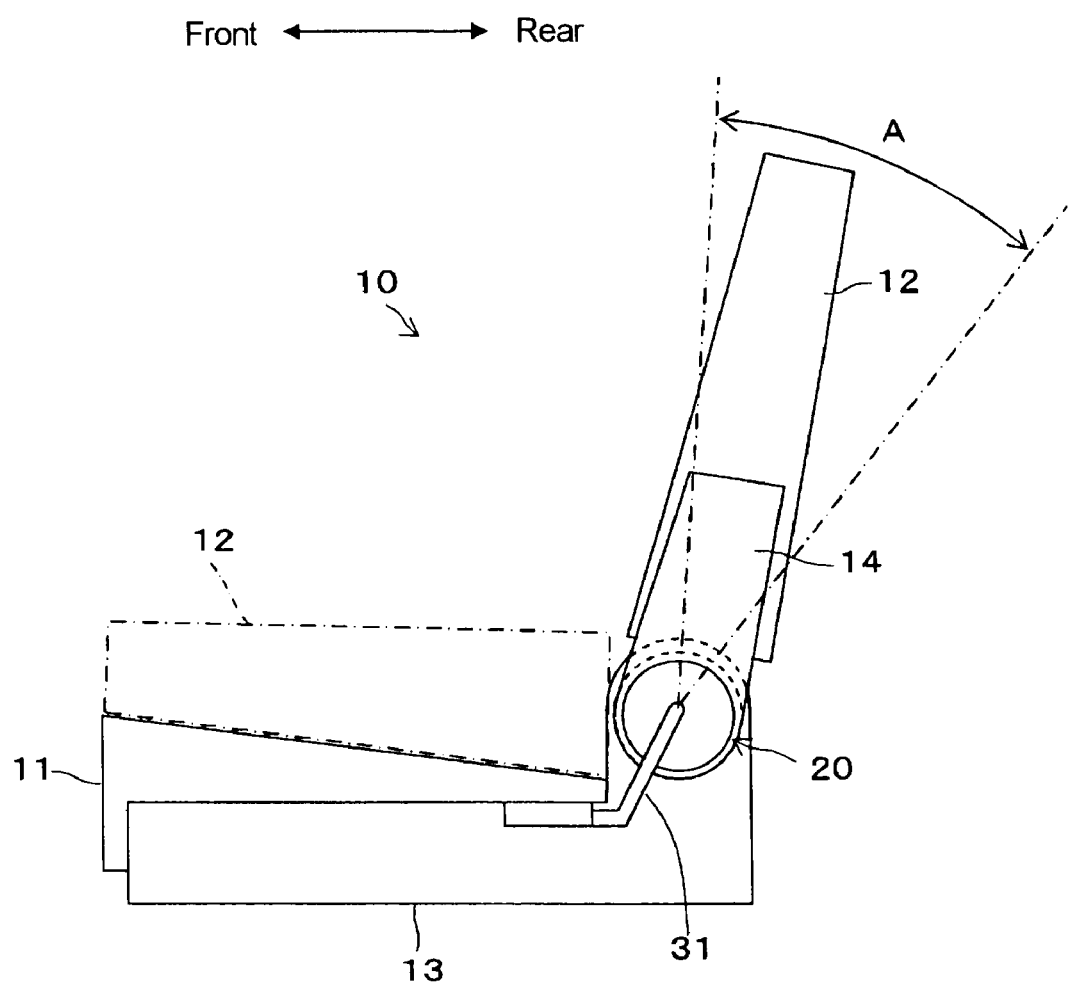
FIG. 1 is a side view of a schematically illustrated vehicle seat to which the vehicle seat reclining device according to the invention is applied.
Figure 2:
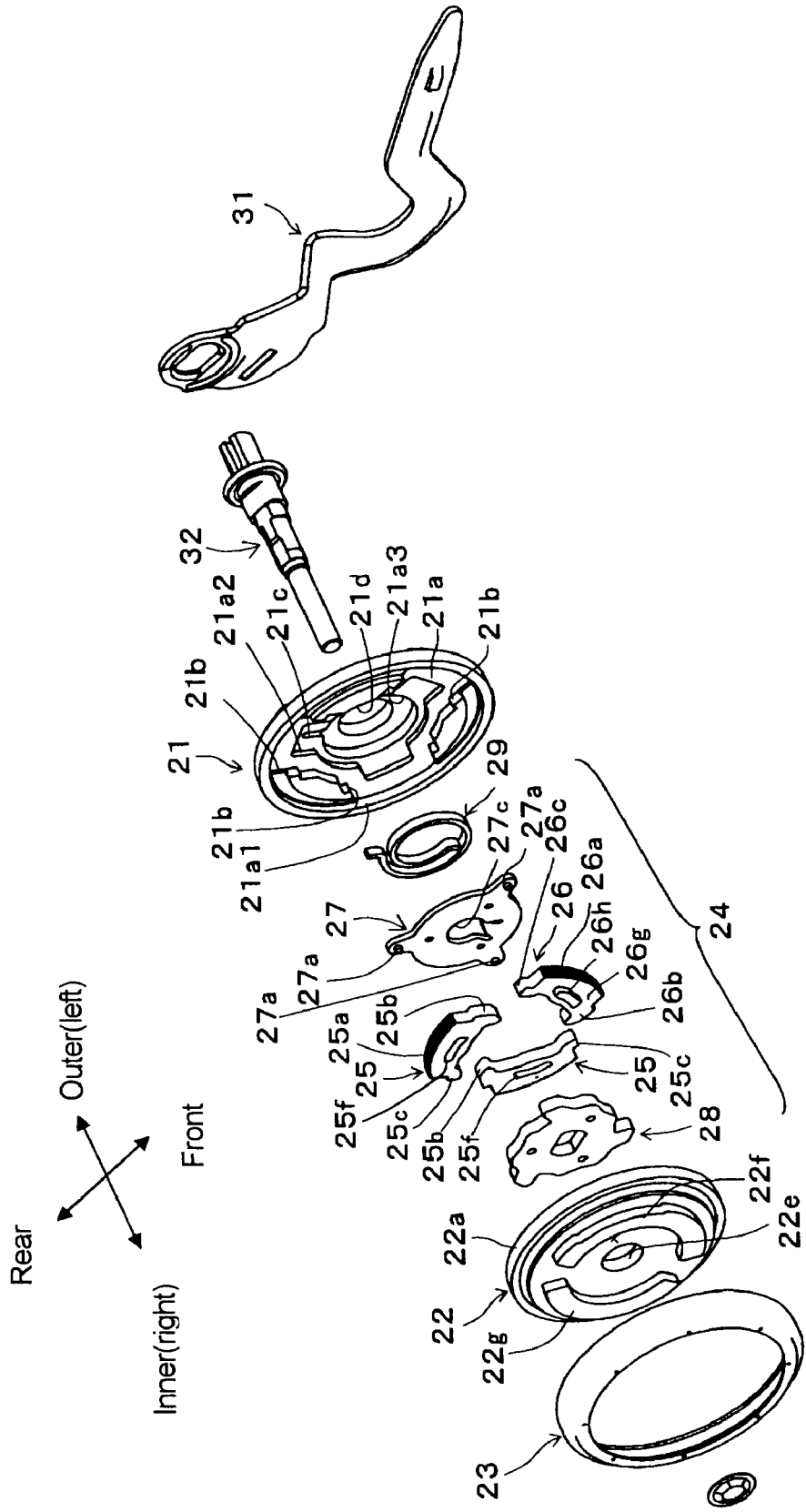
FIG. 2 is an exploded perspective view showing the vehicle seat reclining device shown in FIG. 1.
Figure 3:
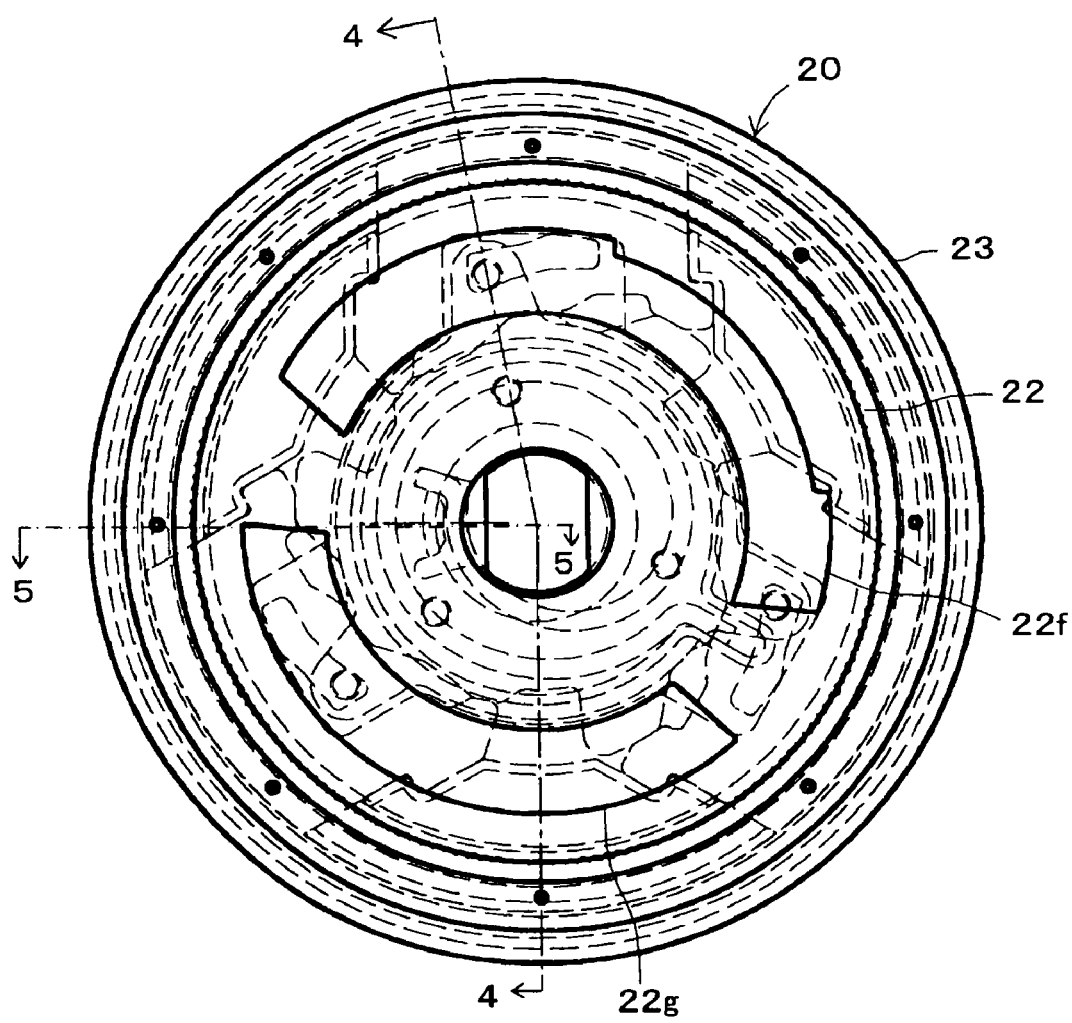
FIG. 3 is an enlarged view showing the vehicle seat reclining device shown in FIG. 1.
Figure 4:
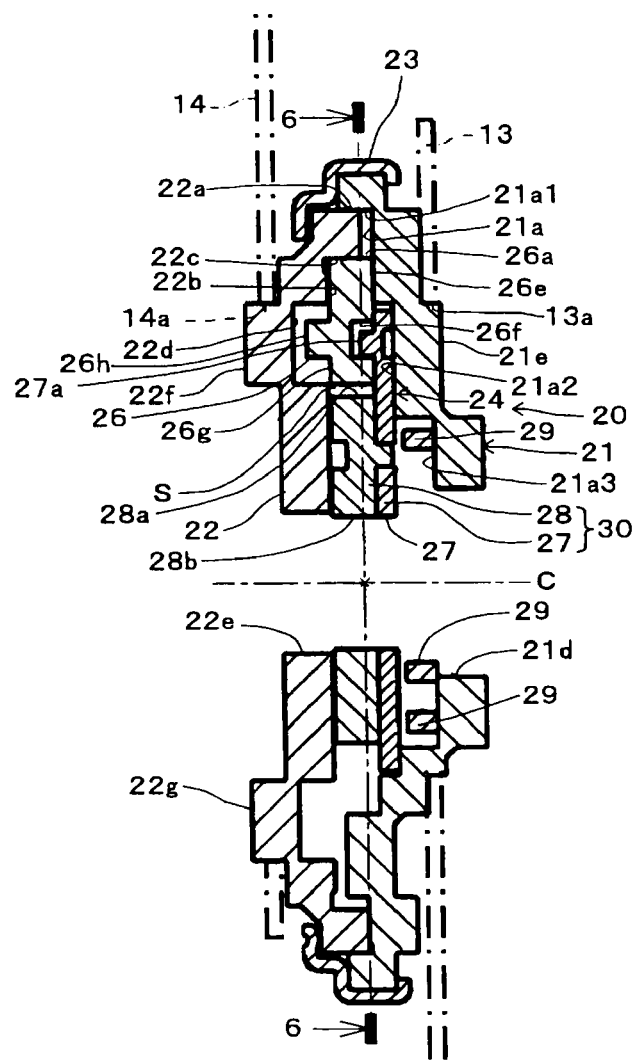
FIG. 4 is a cross sectional end view taken along the line 4-4 of FIG. 3.
Figure 5:
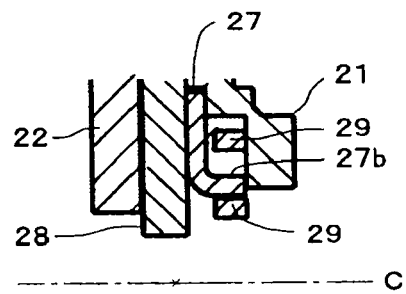
FIG. 5 is a cross sectional end view taken along the line 5-5 of FIG. 3 and particularly showing inside portion from the third and fourth projections.

One of the embodiments of the vehicle seat to which the vehicle seat reclining device according to the invention is applied will be explained with reference to the attached drawings. FIG. 1 is a side view of a vehicle seat schematically illustrated. FIG. 2 is an exploded perspective view of the vehicle seat reclining device and FIG. 3 is an enlarged view of the vehicle seat reclining device. FIG. 4 is an end view taken along the line 4-4 of FIG. 3 and FIG. 5 is an end view taken along the line 5-5 of FIG. 3.

As shown in FIG. 1, the vehicle seat 10 includes a seat cushion 11 to be fixed to a vehicle floor (not shown), a seat back 12 rotatably supported by a rear side of the seat cushion 11 and a vehicle seat reclining device 20 (hereinafter simply called as reclining device) for adjusting a reclining position of the seat back 12 relative to the seat cushion 11 according to any desired position of an occupant of the seat and locking the seat back 12 to a selected position. The position of the seat back 12 is adjusted and locked to any desired reclined angle within a predetermined angle A and further the seat back 12 can be tilted forward until the seat back 12 overlaps on the seat cushion 11 (the state showing with a dashed line in FIG. 1).

The reclining device 20 mainly includes a disc shaped lower arm (first arm) 21 and a disc shaped upper arm (second arm) 22 as shown in FIG. 2. The lower arm 21 is adapted to be fixed to the seat cushion 11 side. In other words, the lower arm 21 is fixed by welding or the like to a seat cushion frame 13 to which the seat cushion 11 is fixed. The upper arm 22 is relatively rotatably supported by the lower arm 21. The upper arm 22 is adapted to be fixed to the seat back 12 side. In other words, the upper arm 22 is fixed by welding or the like to a seat back frame 14 to which the seat back 12 is fixed.

The lower arm 21 includes a recess portion 21a opening towards the upper arm 22 side as shown in FIGS. 2 and 4. The recess portion 21a is formed by half die cutting process or a half blanking process and includes an inner peripheral surface 21a1 having a central rotation axis C which is common to the central rotation axis of the upper and lower arms 22 and 21. The upper arm 22 is fitted into the lower arm 21 and an outer peripheral surface 22a of the upper arm 22 is slidably engaged with the inner peripheral surface 21a of the lower arm 21 to function as a shaft and bearing surface in a relative rotation therebetween. On the other hand, the upper arm 22 includes a recess 22b open to the lower arm 21 side. The recess 22b is formed by half die cutting process and is provided with an internal toothed portion 22c around the entire inner peripheral surface of the recess 22b centering on the rotation axis C. The internal toothed portion 22c is provided in an inner space S formed between the lower arm 21 and the upper arm 22.

As shown mainly in FIG. 4, a ring member 23 is staked to the lower arm 21 for covering the outer peripheral portion of the lower arm 21 and one side surface of the ring member 23 embraces the outer peripheral portion of the upper arm 22 and rotatably supports thereof. Thus, the lower arm 21 and the upper arm 22 are supported under a condition that both arms are mutually rotatably assembled.

As shown in FIGS. 2 and 4, a lock mechanism 24 is provided in the inner space S formed between the lower arm 21 and the upper arm 22 for locking the seat back 12 to an adjusted reclined position. The lock mechanism 24 mainly includes a pawl 25 provided with an external toothed portion (engaging toothed portion) 25a engaging with or disengaging from (releasable from the engaging state) the internal toothed portion 22c formed at the upper arm 22, a pawl 26 provided with an external toothed portion (engaging toothed portion) 26a engaging with or disengaging from (releasable from the engaging state) the internal toothed portion 22c formed at the upper arm 22, a release plate 27 rotatable by a rotation shaft 32 rotated by an operating lever 31, a cam 28 engaging the pawls 25 and 26 with the internal toothed portion 22c or disengaging the pawls 25 and 26 from the internal toothed portion 22c in response to the rotation of the release plate 27 and a spring 29 rotatably urging or biasing the cam 28 in a direction to push the pawls 25 and 26.

A plural number of (in the embodiment, three) pawls 25 and 26 is arranged in a plane intersecting with the rotation axis C with a right angle and each pawl is arranged with an equal angle with one another. In this embodiment, the number of pawl 25 is two (2) and the number of pawl 26 is one (1). As to the number of pawl 26, at least one is needed, but one is enough. The pawls 25 and 26 are movable (reciprocal) in a radial direction within a guide recess 21b formed at the recess 21a of the lower arm 21 and extending in a radial direction. The internal toothed portion 22c and the external toothed portions 25a and 26a are engaged with or disengaged from each other by the respective movements of the pawls 25 and 26.

Figure 6:
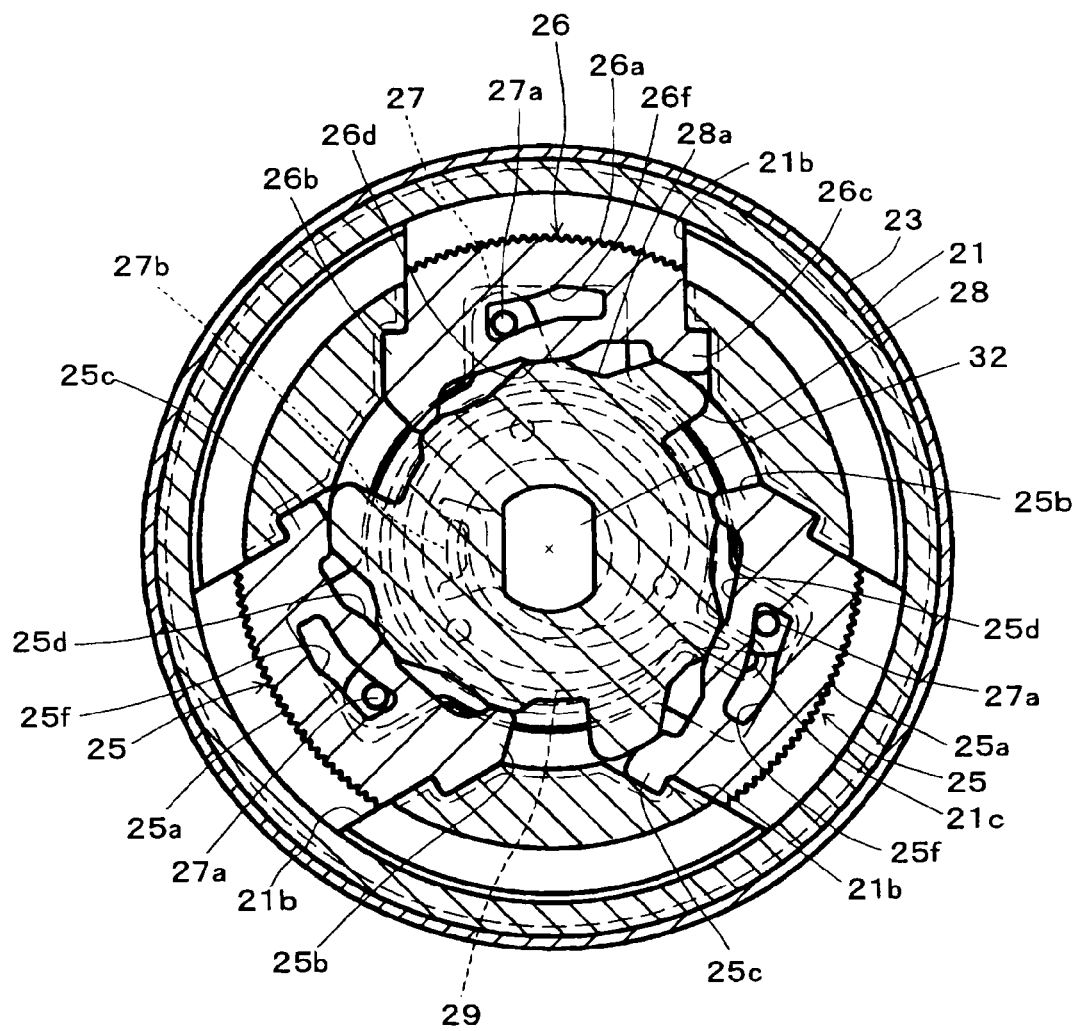
FIG. 6 is a cross sectional view taken along the line 6-6 of FIG. 4 and showing the locked condition of the vehicle seat reclining device.
Figure 7:
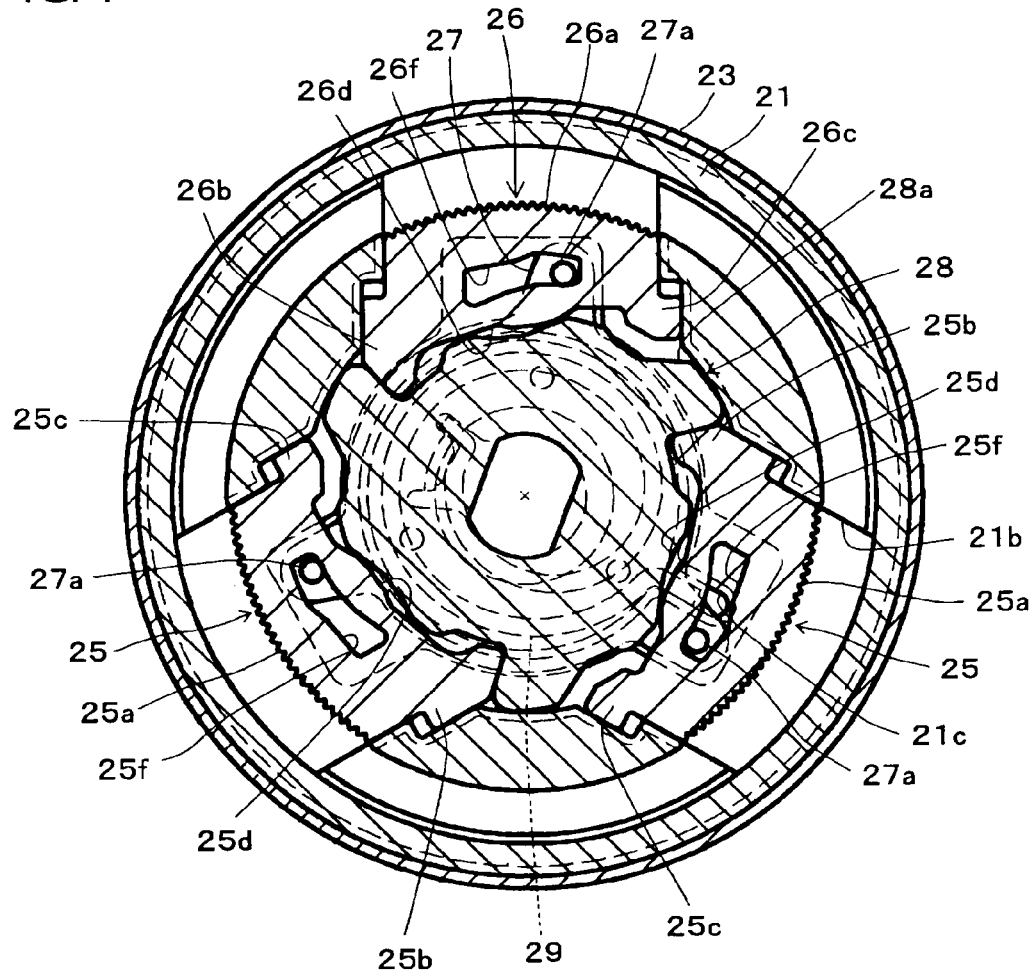
FIG. 7 is a cross sectional view taken along the line 6-6 of FIG. 4 similar to FIG. 6, but showing the unlocked condition of the vehicle seat reclining device.

As shown in FIGS. 2, 6 and 7, the pawl 25 is approximately of circular-shape and includes the external toothed portion at the top portion 25a (outward in a radial direction under the assembled state) to be engaged with the internal toothed portion 22c of the upper arm 22. The pawl 25 further includes a pair of right and left leg portions 25b and 25c formed at the opposite side to the top portion (inward in a radial direction under the assembled state). Further, an inner side surface portion 25d is provided at approximately middle portion between the right and left leg portions 25b and 25c. The two leg portions 25b and 25c and the inner side surface portion 25d are in contact with a cam surface 28a formed on the outer peripheral portion of the cam 28 to be pushed outward.

Further, the pawl 25 is provided with a cam groove 25f formed at a first opposing surface (not shown) opposing to the lower arm 21. A cam projection 27a (first projection) formed at the release plate 27 is inserted into the cam groove 25f. The cam groove 25f is a through-hole groove according to this embodiment.

The pawl 26 is structured basically same as the pawl 25 and as shown in FIGS. 2, 4, 6 and 7, the pawl 26 includes an external toothed portion 26a, a pair of right and left leg portions 26b and 26c, an inner side surface portion 26d, a first opposing surface 26e and a cam groove (first cam groove) 26f. The first opposing surface 26e may be directly in contact with the lower arm 21 or may not be in direct contact, but it may simply be opposing to the lower arm 21.

As shown in FIGS. 6 and 7, when the release plate 27 is rotated, the leg portion 25b and 25c and the inner side surface portion 25d engages with the cam surface 28a and the cam projection 27a engages with the cam groove 25f. By such cam engagement, the cam 28 and the cam projection 27a rotate and the pawl 25 advances or retracts relative to the internal toothed portion 22c of the upper arm 22. Similarly when the release plate 27 is rotated, the leg portions 26b and 26c and the inner side surface portion 26d engages with the cam surface 28a and the cam projection 27a engages with the cam groove 26f. By such cam engagement, the pawl 26 advances or retracts relative to the internal toothed portion 22c.

Further, the pawl 26 is provided with a cam projection (second projection) 26h formed at a second opposing surface 26g opposing to the upper arm 22 as shown in FIGS. 2 and 4. The second opposing surface 26g is arranged to be in opposite to and in direct contact with the inner wall surface of the recess 22b of the upper arm 22. The cam projection 26h is inserted into a cam groove 22d formed at the upper arm 22.

Figure 8:
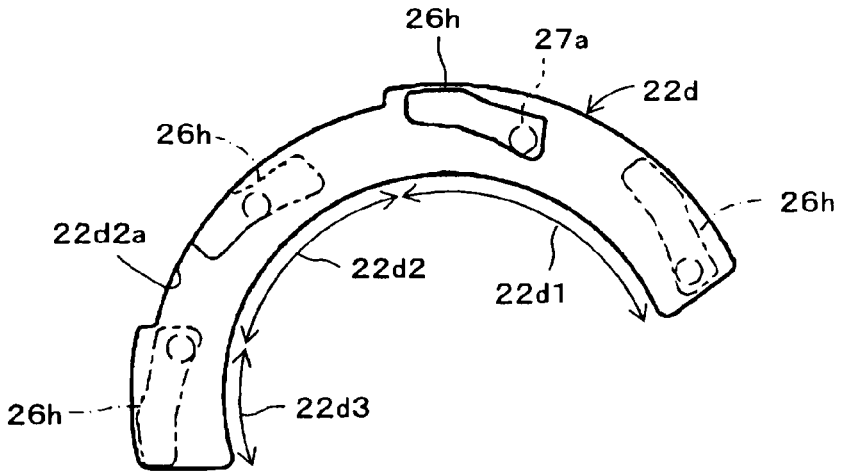
FIG. 8 is a view showing the engagement condition of the second projection of the pawl 26 and the second cam groove of the upper arm.

The cam groove (second cam groove) 22d is approximately of circular-shape and extends along the outer peripheral brim portion of the inner wall surface of the recess 22b of the upper arm 22. The cam groove 22d is formed by a half die cutting process in which the upper arm 22 is pressed from the inner wall surface towards the outer wall surface to a die. The cam groove 22d includes, as shown in FIG. 8, a wide width portion 22d1, a narrow width portion (restricting portion) 22d2 and another wide width portion 22d3 continuously formed in series. The respective lengths of the wide width portions 22d1 and 22d3 and the narrow width portion 22d2 are set based on the predetermined angle adjustable range A of the seat back 12, the overlapped condition of seat back on the seat cushion 11 and the restricting range of the pawls 25 and 26 engaging with the upper arm 22. The outer peripheral side diameter of the narrow width portion 22d2 is set to be smaller than those of the wide width portions 22d1 and 22d3.

As shown in FIG. 8, the cam projection 26h is movable (reciprocal) along in the cam groove 22d in a circumferential direction (longitudinal direction). In FIG. 8, the cam projection 26h indicated with a bold line is positioned at the front end of the wide width portion 22d1, and while the cam projection moves from this position towards the rear end (indicated with a chain line at the right side from the position with the bold line) of the wide width portion 22d1, the inward and outward movements of the pawl 26 relative to the internal toothed portion 22c are not restricted. When the cam projection 26h comes to the narrow width portion 22d2 (indicated with a chain line at the left side from the position with the bold line) to be in contact with the projection 22d2a formed at the cam groove 22d, the cam projection 26h is kept inward in a radial direction to prevent the pawl 26 from engaging with the internal toothed portion 22c. When the cam projection 26h further moves and positions at the left side wide width portion 22d3 positioned at the left side of the narrow width portion 22d2 (indicated with a chain line at further left side from the position indicated with the chain line at the narrow width portion 22d2), the inward and outward movements of the pawl 26 relative to the internal toothed portion 22c is not restricted.

Thus, the narrow width portion 22d2 forms the restricting portion for restricting the movement of the pawl 26 towards a direction for engaging with the internal toothed portion 22c by engaging with the cam projection (second projection) 26h. The two wide width portions 22d1 and 22d3 formed continuously with the both ends of the narrow width portion form a non-restricting portion for allowing the pawl 26 to be engaged with the internal toothed portion 22c without engaging with the cam projection 26h.

The above cam groove 26f and cam projection 26h of the pawl 26 are formed at the pawl 26 by half die cutting process in which the pawl 26 is pressed from the first opposing surface 26e towards the second opposing surface 26g to a die.

The release plate 27 is provided in the inner space S and arranged between the lower arm 21 and the first opposing surface 26e of the pawl 26 and rotatable centering on the rotation axis C as shown in FIGS. 2, 4, 6 and 7. In other words, the release plate 27 is accommodated in an accommodating recess 21a2 formed at the recess 21a of the lower arm 21. The release plate 27 is provided with the cam projection (first projection) 27a to be inserted into the cam groove (first cam groove) 26f of the pawl 26 and the cam projection 27a moves the pawl 26 by the rotation of the release plate 27 by the engagement between the cam groove 26f and the cam projection 27a. Further, the release plate 27 also is provided with another cam projection 27a to be inserted into the cam groove 25f of the pawl 25 and the cam projection 27a moves the pawl 25 by the rotation of the release plate 27 by the engagement between the cam groove 25f and the cam projection 27a.

The release plate 27 includes an engaging portion 27b with which a cam 28 side end of the spring 29 is engaged. The engaging portion 27b is formed by bending. The release plate further includes a through hole 27c for inserting the rotation shaft 32 therein for unitary rotation therewith.

The cam 28 is provided in the inner space S and rotatable on the rotation axis C. The cam 28 is fixed to the release plate 27 at the upper arm 22 side surface for unitary rotation therewith and pushes the pawls 25 and 26 in a direction to be in engagement with the internal toothed portion 22c of the upper arm 22. The cam 28 is provided with the cam surface 28a at the outer peripheral side wall surface and the pawls 25 and 26 are provided at the outer peripheral portion in a radial direction to have the same surface with the cam 28 so that the pawls can be movable. Further, the cam includes a through hole 28b into which the rotation shaft 32 is inserted for unitary rotation therewith.

The pawl control member 30 is formed by the release plate 27 and the cam 28 and as shown in FIG. 4, the pawl control member 30 is provided within the inner space S and arranged between the lower arm 21 and the first opposing surface 26e of the pawl 26 and rotatable on the rotation axis C. The pawl control member 30 at least includes the cam projection 27a as the first projection inserted into the cam groove 26f of the pawl 26 for controlling the movement of the pawl 26 in response to the rotation of the pawl control member 30 by the engagement between the cam groove 26f and the cam projection 27a. Here, it is noted that the cam 28 may be formed with the cam projection 27a and the engaging portion 27b instead of forming on the release plate 27.

The spring 29 is provided in the inner space S between the lower arm 21 and the cam 26. In other words, the spring 29 is accommodated in the accommodating recess 21a3 formed at the accommodating recess 21a2 of the lower arm 21. The spring is a spiral type spring rotationally biasing the cam 28 in a direction to push the pawls 25 and 26. The cam 28 side end (free end) of the spring 29 is engaged with the engaging portion 27b of the release plate 27 and the lower arm 21 side end (fixed side end) of the spring 29 is engaged with an engaging portion 21c of the lower arm 21.

The operating lever 31 is at one end thereof fixed to the outer end of the rotation shaft 32 for unitary rotation therewith and an occupant of the seat rotates the lever 31 at the other end for operation. The rotation shaft 32 is provided for rotation on the rotation axis C and inserted into each through hole 21d, 27c, 28b and 22e of the lower arm 21, the release plate 27, the cam 28 and the upper arm 22. The rotation shaft 32 is rotatably supported by the lower arm 21 and the upper arm 22.

As shown in FIG. 4, the accommodating recess 21a2 for accommodating the release plate 27 is formed by a half die cutting process in which the lower arm 21 is pressed from the inner space side to a die and the projection (the third projection) 21e is formed at the same time. This projection 21e is utilized as a joining projection for assembling to the seat cushion 11. In more detail, the projection 21e is inserted into an attaching recess 13a formed at the seat cushion frame 13 and is welded after insertion for attaching.

Further, as shown in FIGS. 2 and 4, the cam groove (second cam groove) 22d is formed by half die cutting process in which the upper arm 22 is pressed from the inner space S side to a die and at the same time the semicircular-shaped projection (fourth projection) 22f is formed. Further, the upper arm 22 includes the semicircular-shaped projection 22g at the position opposing to the projection 22f formed by half die cutting process performed on the upper arm 22. The two projections 22f and 22g are used for attaching the upper arm 22 to the seat back 12. In more detail, the projections 22f and 22g are inserted into the corresponding recess 14 provided at the seat back frame 14 and fixed thereto by welding, for instance for fixing the upper arm 22 to the seat back frame 14.

Next, the operation of the vehicle seat reclining device constructed as mentioned above will be explained. When the operating lever 31 is not operated by the occupant of the seat (in case the lever 31 being not held upward in FIG. 1), the release plate 27 and the cam 28 are biased or urged in a counterclockwise direction as viewed in FIG. 6 by the force of the spring 29 and this counterclockwise rotation makes the pawls 25 and 26 move towards the internal toothed portion 22c to engage the external toothed portions 25a and 26a of the pawls with the internal toothed portion 22c thereby to engage the pawls 25 and 26 with the upper arm 22. Thus the seat back 12 is locked at the desired reclined position.

On the other hand, when the operating lever 31 is manually operated by the occupant of the seat (in case the lever 31 being held upward in FIG. 1), the release plate 27 and the cam 28 are rotated in a clockwise direction overcoming the force of the spring 29 as viewed in FIG. 7. This clockwise rotation makes the pawls 25 and 26 move away from the internal toothed portion 22c to disengage the engagement between the external toothed portions 25a and 26a and the internal toothed portion 22xc to eventually release the engagement between the pawls 25 and 26 and the upper arm 22.

During the operating lever 31 being operated, the engagement between the pawls 25 and 26 and the upper arm 22 is released and therefore, the tilting of the seat back 12 can be carried out. The range of this tilting is from the rear end position in the range A to the condition of overlapping on the seat cushion 11 as shown in FIG. 1.

Within the predetermined range A, the seat back 12 can be adjusted to any desired angle position and once the position is decided, the operating lever 31 is released to again engage the pawls 25 and 26 with the upper arm 22 to lock the position of the seat back 12.

From the front end position in the range A to the overlapped position, even if the operation of the operating lever 31 is released, the cam projection 26h engages with the outer peripheral portion of the narrow width portion (restriction portion) 22d2 and this engagement restricts the engagement between the pawls 25 and 26 and the upper arm 22. Thus, without using the operating lever 31, the seat back 12 can be tilted. In this case, when the cam projection 26h is engaged with the outer peripheral portion of the narrow width portion (restricting portion) 22d2, the returning of the release plate 27 and the cam 28 to the engagement position as shown in FIG. 6 is restricted by the engagement between the cam projection 26h and the outer peripheral portion of the narrow width portion 22d2. The other pawl 25 can also keep the position as similar to the pawl 26.

Under the overlapped position of the seat back, by releasing the release lever 31 at the overlapped position, the pawls 25 and 26 are engaged with the upper arm 22 to lock the seat back 12 at the overlapped position.

As apparent from the explanation above, according to the embodiment of the invention, the projection (first projection) 27a formed at the pawl control member 30 which controls the movement of the pawl 26, is inserted into the cam groove (first cam groove) 26f formed at the first opposing surface 26e of the pawl 26 opposing to the lower arm (first arm) 21. Thus when the pawl control member 30 is rotated in a clockwise direction, the pawl 26 under engagement with the internal toothed portion 22c is released from the engagement by the projection 27a and the cam groove 26f. Further, the projection (second projection) 26h formed at the second opposing surface 26g of the pawl 26 opposing to the upper arm (second arm) 22 is inserted into the cam groove (second cam groove) 22d formed at the upper arm 22 side and having the narrow width portion (restricting portion) 22d2 and the wide width portions (non-restricting portion) 22d1 and 22d3. Thus when the projection 26h is engaged with the restricting portion 22d2, the movement of the pawl 26 towards the engagement direction with the internal toothed portion 22c is restricted to keep the engagement released condition between the pawl 26 and the internal toothed portion 22c. Thus, without interposing any member between the pawl 26 and the pawl control member 30, the engagement of the projection 27a with the cam groove 26f can be surely achieved and since the length of the projection 27a can be relatively shortened to assure the strength of the projection 27a. Further, without interposing any member between the pawl 26 and the upper arm 22 side, the engagement of the projection 26h with the cam groove 22d can be surely achieved and since the length of the projection 26h can be relatively shortened to assure the strength of the projection 26h.

Further, the cam groove 26f and the projection 26h are formed on the pawl 26 by half die cutting process in which the pawl 26 is pressed from the first opposing surface 26e to the second opposing surface 26g to lower the cost of production and achieve simple process of producing the pawl 26.

Further, since the pawl control member 30 is formed by the release plate 27 and the cam 28, the pawl control member 30 is produced with a low cost by just integrally connecting the two different parts, release plate 27 and the cam 28 instead of making pawl control member with a more complicated shape.

Further, the spring 29 is provided in the inner space S between the lower arm 21 and the cam 28 for always rotatably biasing the cam 28 towards the pushing direction of the pawls 25 and 26. The engaging portion 27b is provided at the release plate 27 for engaging the cam 28 side end of the spring 29 to give a detent function of the spring to the release plate 27 to suppress the increase of the number of part as well as the manufacturing cost.

Further, the accommodating recess 21a2 for accommodating a part of (in the embodiment, the release plate 27) of the pawl control member 30 is formed at the lower arm 21 by half die cutting process in which the lower arm 21 is pressed from the inner space S side. The third projection 21e is formed at the same time with the accommodating recess 21a2 by half die cutting process performed on the lower arm 21. The third projection 21e is used as a joining projection for attaching the lower arm to the seat cushion 11. The upper arm 22 is formed with the second cam groove 22d by half die cutting process in which the upper arm 22 is pressed from the inner space S side and the fourth projection 22f formed at the same time with the second cam groove 22d by the same half die cutting process performed on the upper arm 22. This fourth projection 22f is used as a joining projection for attaching the upper plate to the seat back 12. Thus, the assembling efficiency of the lower and upper arms 21 and 22 to the seat cushion 11 and the seat back 12 can be improved and also the thickness of the lower and upper arms 21 and 22 can be reduced.

According to the embodiment, the second cam groove 22d is formed at the upper arm 22. However, as stated in the background of the technology, the unlocking plate formed with the second cam groove may be used as a unit with the rotation side housing as disclosed in the patent document 1. In other words, the upper arm 22 of this embodiment can be formed by two different parts, an unlocking plate and rotation side housing.

As stated above in the embodiment, the lower arm 21 as the first arm is fixed to the seat cushion 11 side and the upper arm 22 as the second arm is fixed to the seat back 12 side. However, in opposite, the lower arm 21 may be fixed to the seat back 12 side and the upper arm 22 may be fixed to the seat cushion side.

INDUSTRIAL APPLICABILITY

The vehicle seat reclining device according to the invention can be adapted to the type in which all projections are surely engaged with the corresponding cam grooves and all projections are assured to have sufficient strength.

The invention claimed is:

1. A vehicle seat reclining device comprising:
   a first arm adapted to be fixed to one of a seat cushion side and a seat back side of a vehicle seat;
   a second arm adapted to be fixed to the other of the seat cushion side and the seat back side of the vehicle seat and relatively rotatably supported by the first arm;
   an internal toothed portion provided in an inner space formed between the first arm and the second arm, the internal toothed portion being formed at the second arm;
   a pawl provided in the inner space and movably supported by the first arm, the pawl having an external toothed portion engaging with or disengaging from the internal toothed portion in response to the movement of the pawl;
   a first cam groove formed at a first opposing surface of the pawl opposing to the first arm;
   a pawl control member rotatably provided in the inner space between the first arm and the first opposing surface and having at least a first projection inserted into the first cam groove, thereby controlling the movement of the pawl by the engagement between the first cam groove and the first projection in response to the rotation of the pawl control member;
   a second projection formed at a second opposing surface of the pawl opposing to the second arm; and,
   a second cam groove formed at a second arm side, into which the second projection is inserted and having a restricting portion for restricting the movement of the pawl in a direction to be engaged with the internal toothed portion by the engagement with the second projection and a non-restricting portion provided consecutively from both ends of the restricting portion for allowing the movement of the pawl in the direction to be engaged with the internal toothed portion without engaging with the second projection,
   wherein the pawl control member includes a release plate provided in the inner space and rotatably disposed between the first arm and the first opposing surface, the release plate including the first projection inserted into the first cam groove and moving the pawl in response to the rotation thereof by the engagement between the first cam groove and the first projection, and a cam rotatably provided in the inner space, fixed to the release plate for unitary rotation therewith and pressing the pawl to be in contact with the internal toothed portion.

2. The vehicle seat reclining device according to claim 1, wherein the first cam groove and the second projection are die cut.

3. The vehicle seat reclining device according to claim 1, wherein a spring is further provided in the inner space between the first arm and the cam for rotatably biasing the cam in a direction to press the pawl and the release plate is formed with an engaging portion with which a cam side end of the spring is engaged.

4. The vehicle seat reclining device according to claim 1, wherein the first arm is formed with a third projection comprising a joining projection for attaching the first arm to the seat cushion, and the second arm is formed with a fourth projection comprising a joining projection for attaching the second arm to the seat back.

* * * * *